June 4, 1940. H. W. SHONNARD 2,203,310
HOISTING MECHANISM FOR VEHICLES
Filed May 14, 1938 6 Sheets-Sheet 1
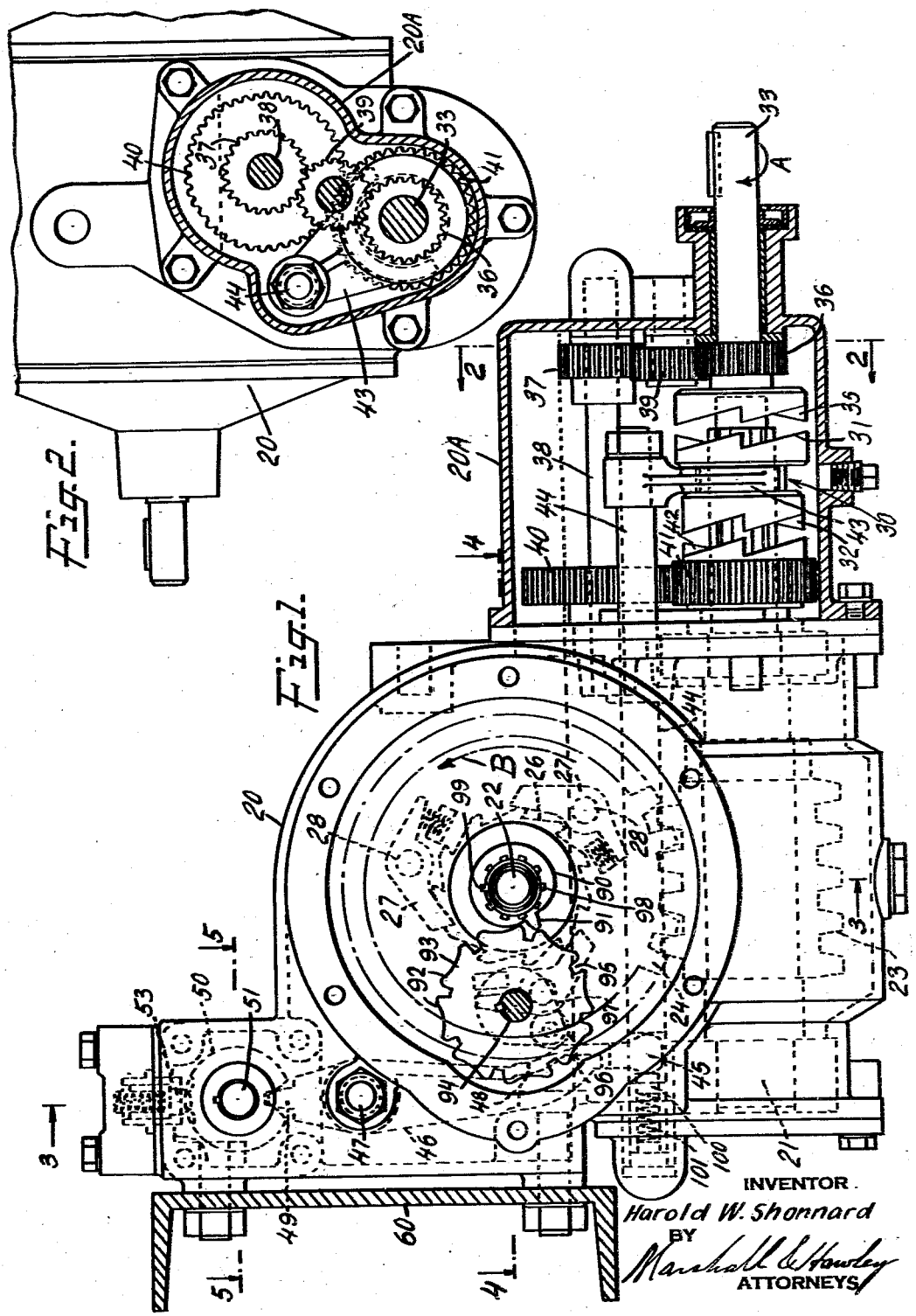

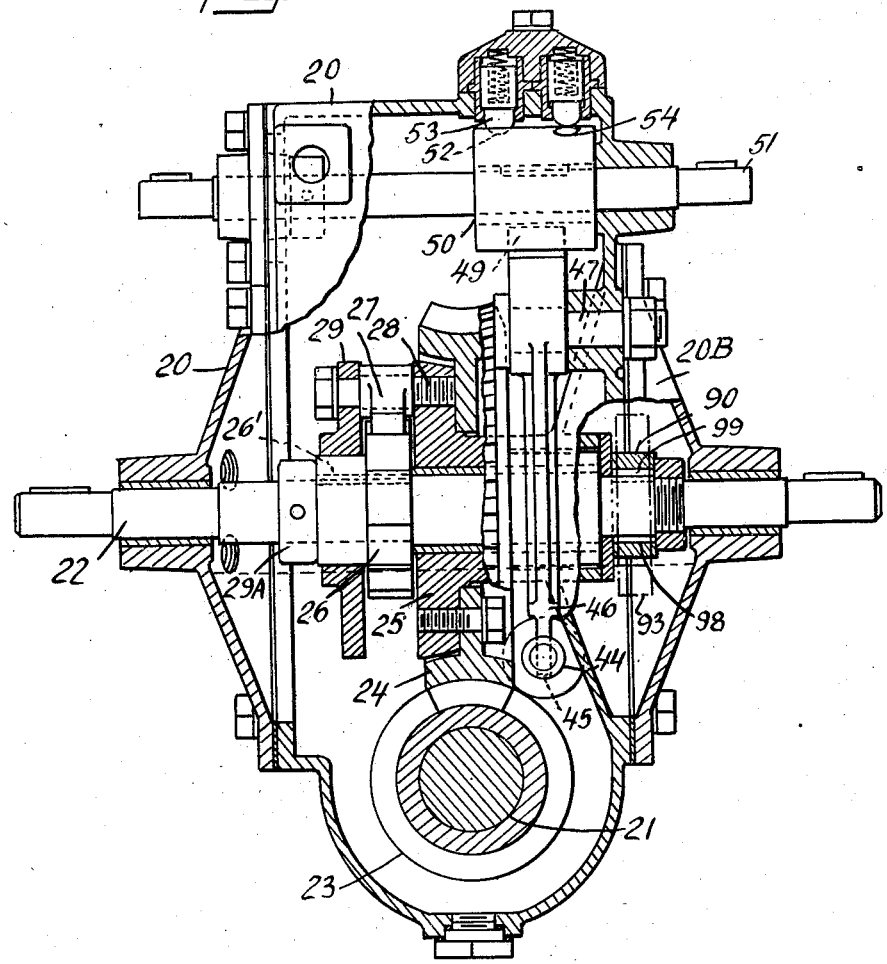

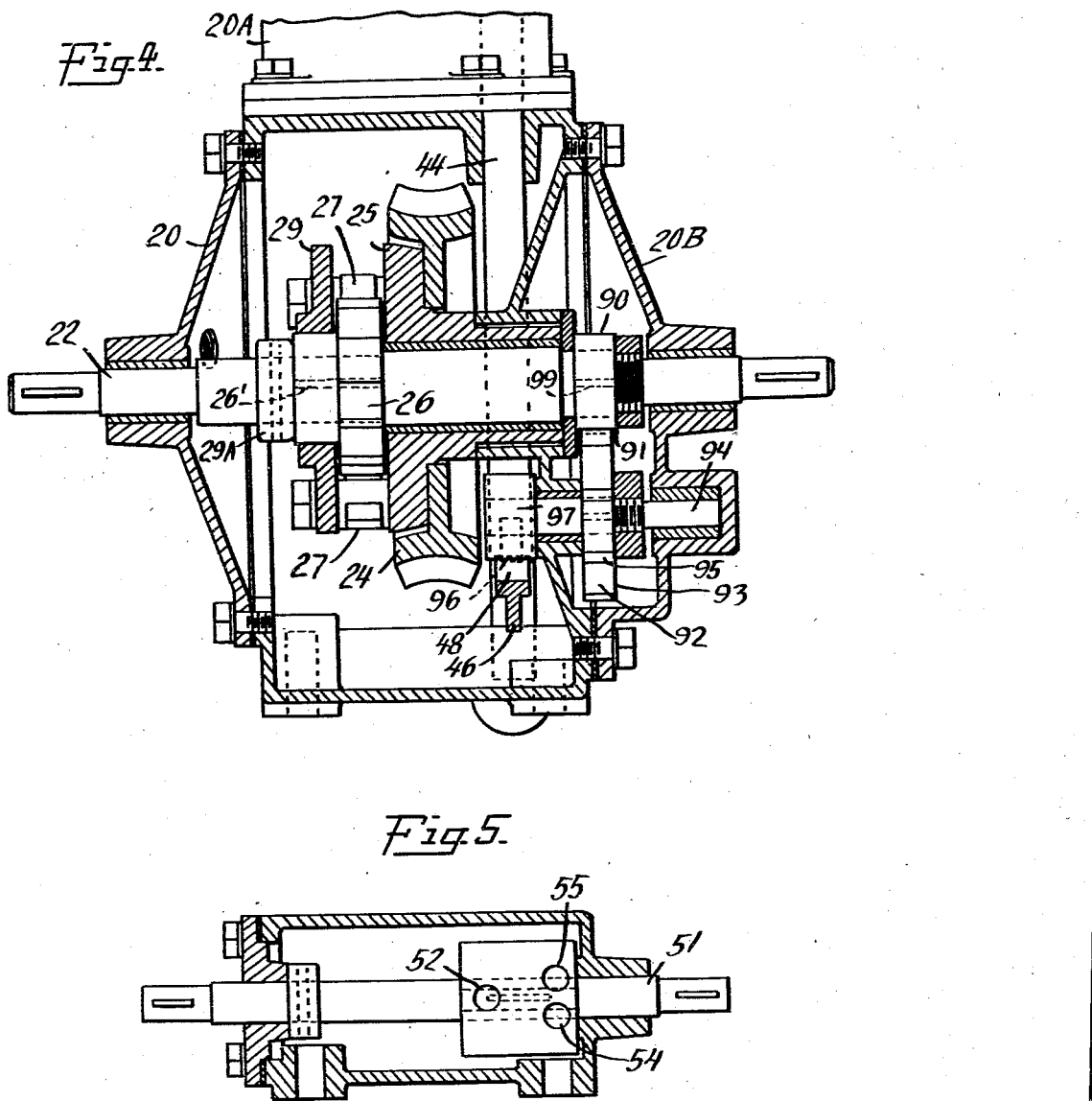

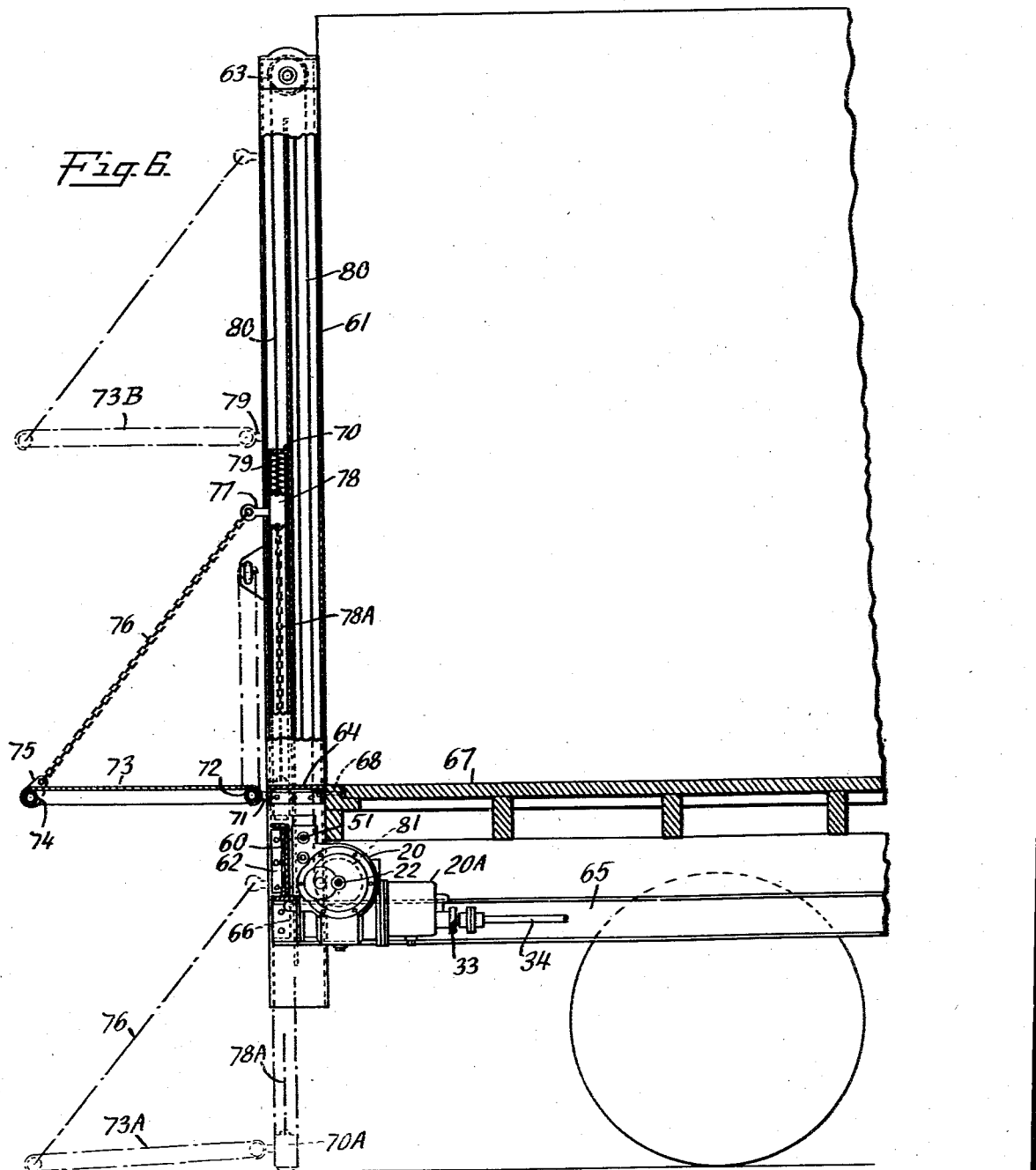

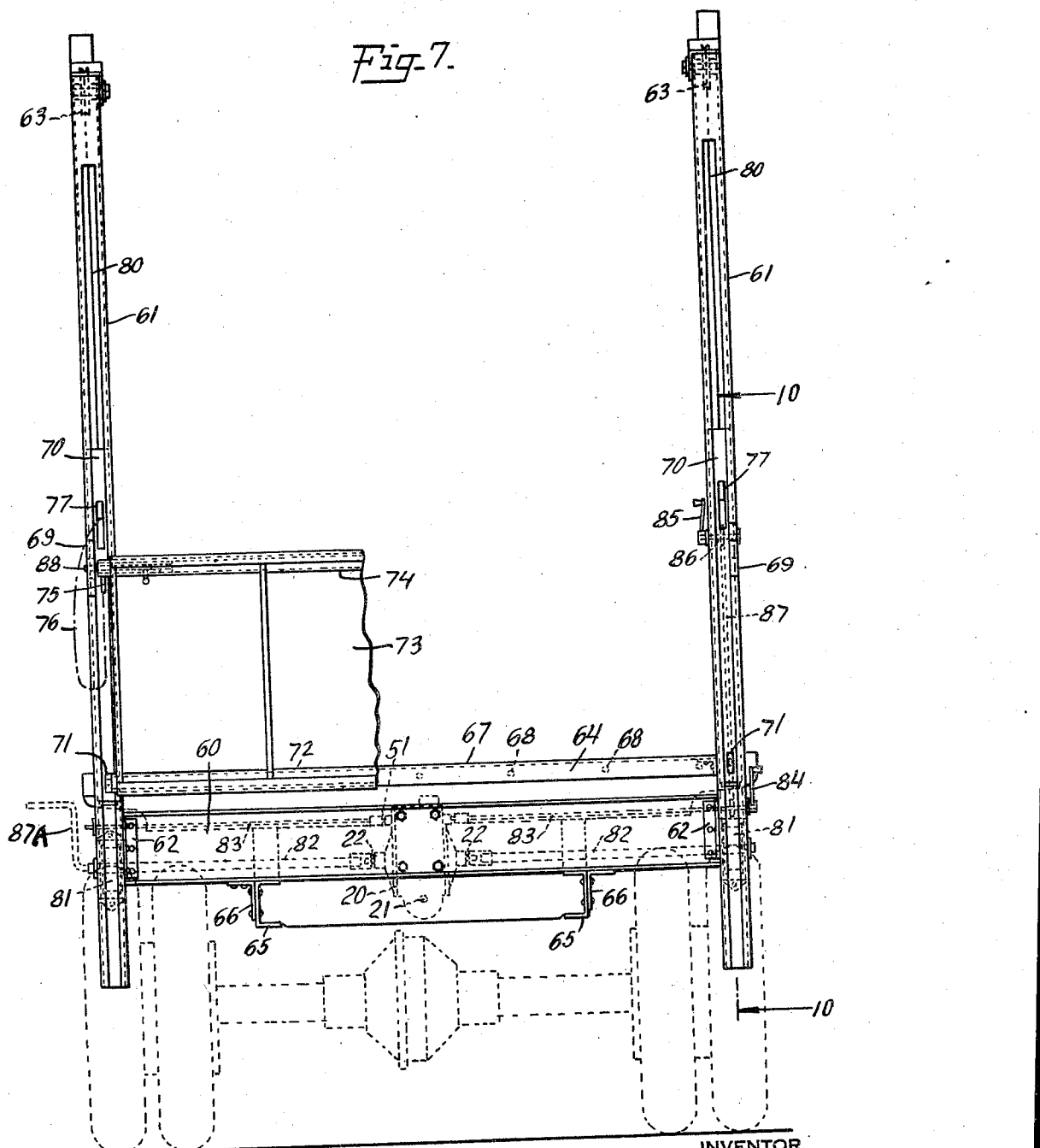

June 4, 1940. H. W. SHONNARD 2,203,310
HOISTING MECHANISM FOR VEHICLES
Filed May 14, 1938 6 Sheets-Sheet 6
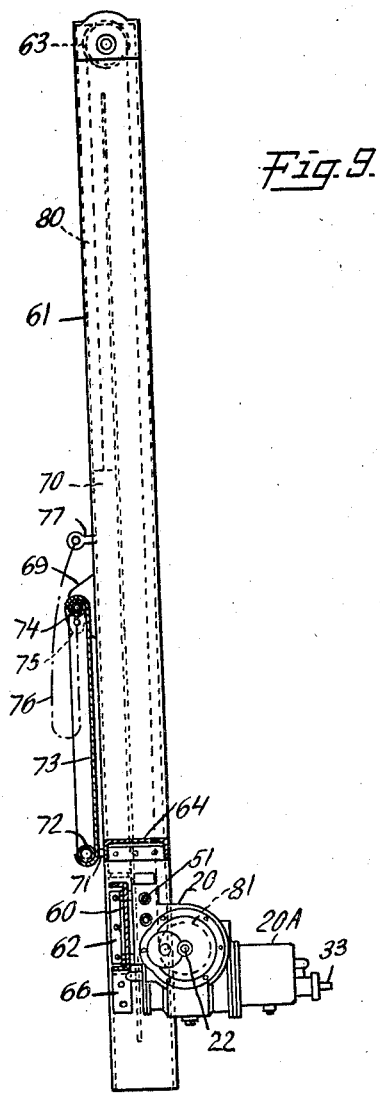
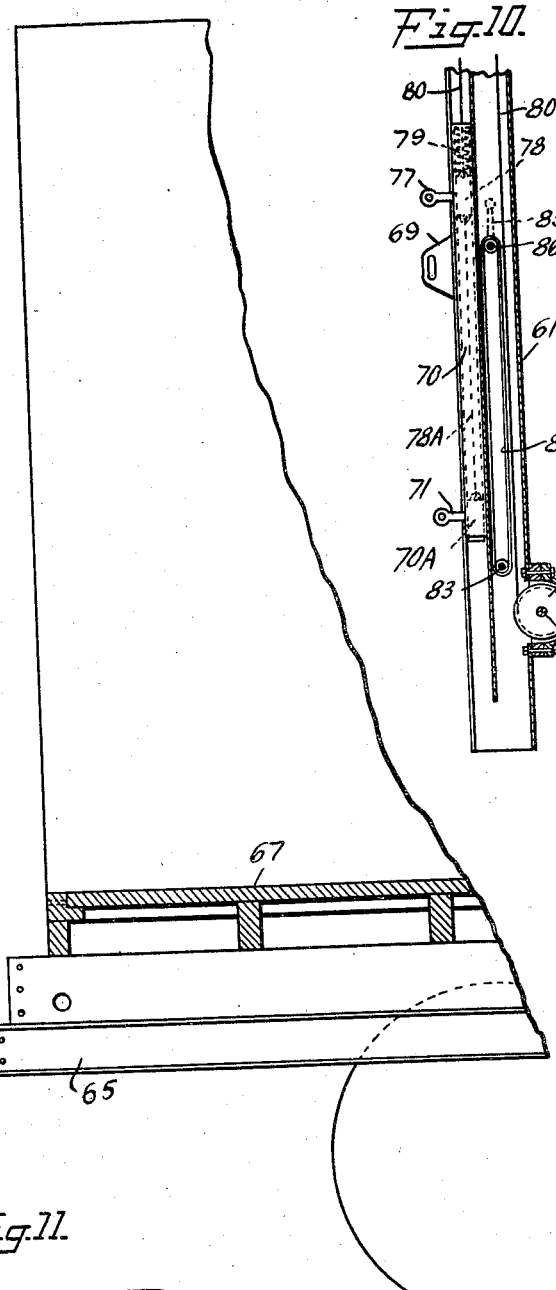
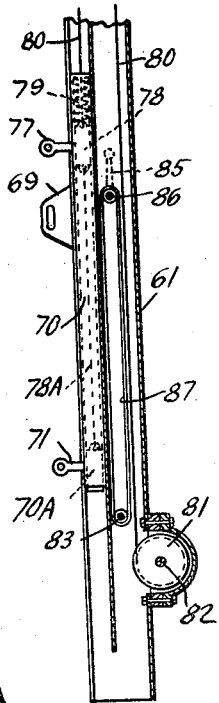
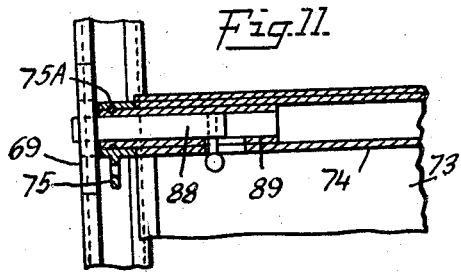
INVENTOR
Harold W. Shonnard
BY
Marshall A. Stanley
ATTORNEYS Patented June 4, 1940

2,203,310

UNITED STATES PATENT OFFICE 2,203,310

HOISTING MECHANISM FOR VEHICLES

Harold W. Shonnard, Montclair, N. J.

Application May 14, 1938, Serial No. 207,909

25 Claims. (Cl. 214—75)

This invention relates to improvements in hoisting mechanism for vehicles.

Its object is to provide a simple structure which comprises an elevator platform, hoisting gear and control mechanism therefor which may be assembled in a unit which is readily attached to a vehicle.

Another object is to so arrange such an apparatus that it may be driven by the motor of the vehicle to which it is attached.

Further objects are to provide controlling levers located at different points convenient for the operator, to provide for automatically stopping the ascent of the lifting platform upon its reaching a predetermined level and to permit it to travel above such level when desired. Means are also provided to prevent undue loosening of the hoisting ropes or cables when the platform by its descent, reaches the ground or an intervening platform, and to tilt the platform at such points to facilitate loading.

These and other objects of the invention will appear in the following specification in which the invention is described, and its novel features pointed out in claims.

Referring to the drawings,

Fig. 1 is a sectional side elevation of a hoisting device and its control mechanism which is made according to and embodies the present invention;

Fig. 2 is a sectional end elevation showing some of the gearing which appears in Fig. 1, the section being taken on the line 2—2 of the latter figure;

Fig. 3 is a similar section taken on the irregular line 3—3 of Fig. 1;

Figs. 4 and 5 are sectional plan views taken respectively on the lines 4—4 and 5—5 of Fig. 1;

Fig. 6 is a side elevation partly in section of the rear end of a vehicle with my apparatus attached thereto;

Fig. 7 is a rear elevation of the parts which are shown in Fig. 6;

Fig. 8 is a side elevation partly in section of a complete assembled structure;

Fig. 9 is a similar view of a part of a vehicle to which the structure shown in Fig. 8 may be attached;

Fig. 10 is a sectional side elevation of one of the side posts, the section being taken on the line 10—10 of Fig. 7; and Fig. 11 is a sectional elevation showing the construction of one of the locks for the platform.

The hoisting mechanism comprises a main casing 20 in which is mounted a longitudinal driving shaft 21 and a transverse driven shaft 22. 23 is a worm affixed to shaft 21, and 24 is a worm gear affixed to a flanged hub 25 which is loosely mounted on shaft 22.

26 is a ratchet member affixed to shaft 22 by a key 26′. 27 are pawls, spring pressed into engagement with the ratchet member. They are mounted on studs 28 projecting from the flange of hub 25 and further supported by a collar 29 rotatably mounted on the hub of ratchet member 26. 29A is a collar pinned to shaft 22 to prevent longitudinal displacement of ratchet member 26. These parts form a free wheeling clutch.

20A is a housing which is affixed to and extends from the rear of casing 20. The longitudinal shaft 21 passes into this housing. On it is slidably but nonrotatively mounted a clutch member 30 with oppositely inclined teeth 31, 32 and an intermediate annular groove. 33 is a shaft in alinement with shaft 21, which enters housing 20A from the rear. This is adapted to be coupled to a power shaft 34 from the engine of the vehicle, as shown in Fig. 6. Shaft 33 terminates inside the housing in a clutch member 35 with inclined teeth which are arranged to engage teeth 31 of the slidable clutch member. 36 is a gear fast on shaft 33 within housing 20A. This drives a gear 37 fast on a countershaft 38 through an intermediate pinion 39. 40 is another gear fast on countershaft 38 in mesh with a gear 41 on a clutch member rotatively mounted on shaft 21 on one side of which are inclined teeth 42 arranged to engage the teeth 32 of the slidable clutch member 30.

The slidable clutch member 30 is actuated by a forked member 43 which is mounted on a slidable rod 44 which extends into the casing 20 where it is engaged at 45 by a lever 46 pivoted at 47, which has a cam surface 48 on one of its sides and a detent 49 above its pivot.

The lever 46 is moved to the right or left by a cam 50 keyed to control shaft 51, which is provided with a depression into which detent 49 extends. The cam 50 has a depression 52 diametrically opposed to the depression which is engaged by detent 49, into which a plug 53 is spring pressed, (Figs. 1 and 5), to form a non-positive lock to maintain the cam 50 and lever 46 in their central or neutral positions. Similar depressions 54, 55 and a plug are provided to similarly maintain these parts in their actuated positions, (Figs. 3 and 5). The clutch members are submerged in oil which cushions their engaging impact.

The casing 20 is affixed to a transverse channel iron 60, to the ends of which are secured posts 61 by angle irons 62. The posts are divided into two channels and near the top of each post is a sheave 63. Between the posts is another channel iron 64.

The assembled structure thus described is shown in Fig. 8, and in Fig. 9 a part of the rear end of a vehicle is illustrated. These parts are shown together in Figs. 6 and 7, in which it will be seen that the channel iron 60 is affixed to the longitudinal beams 65 of the chassis of the vehicle by brackets 66, and that the channel 64 is secured to the rear end of the floor 67 of the vehicle by bolts 68.

One of the channels in each of the posts serves as a guide for a slide 70. An eye bolt 71 extends outwardly from each slide and these hold a transverse tube 72 on which a lifting platform 73 is pivotally supported. The platform as shown is made of sheet iron with one of its edges bent around the tube 72. The other edge of the platform is bent around another transverse tube 74 on which are shackles 75 (Figs. 6 and 8). Supporting chains 76 connect shackles 75 with eye bolts 77 projecting from movable members 78 within the slides 70. The members 78 are pressed downwardly by springs 79.

80 are lifting cables attached to the members 78 and running up through the guiding channels of the posts, over the sheaves 63 and down through the other channels of the posts to winding drums 81. These drums are affixed to shaft extensions 82, 82 which are in substantial alinement with and are coupled to the shaft 22 of the hoisting mechanism.

The control shaft 51 is also provided with extensions 83, 83 which extend through the posts 61 and one or both of them is provided with an operating crank handle 84. 85 is another operating handle at a higher point on one of the posts 61, within convenient reach of an operator on the floor 67 of the vehicle. This is arranged to turn a stub shaft 86 which is connected to turn the control shaft extension 83 by suitable mechanism within the post, such as that illustrated at 87 in Figs. 7 and 10.

The platform 73 may be swung up when not in use into a substantially vertical position, such as that shown in Fig. 7 and in full lines in Fig. 8, to form a tail gate for the vehicle. It may be locked in its raised position by bolts 88 which are arranged to slide into openings in plates 69 which project from the posts 61. A detail of the bolt is shown in Fig. 11 in which it will be seen that the bolt slides in a sleeve 89 within the tube 74 and that the shackle 75 is on this sleeve and is prevented from moving off of it by a pin 75A in a groove in the sleeve.

When the platform is unlocked, it will assume the horizontal position in which it is shown in full lines in Fig. 6. This is because the upper movement of the members 78 is limited by chains 78A attached to them and to plugs 70A at the lower ends of the slides and are held in their upper position by the tension on the lifting cables 80 and because of the predetermined length of the chains 76. When the slides are lowered until they meet the ground or an interposed platform or other object, the tension on cables 80 is released and the members 78, aided by the springs 79 will slide down in the slides 70 and allow the platform to tilt into the position shown in broken lines at 73A. This facilitates loading and unloading.

I will now describe the operation of such of the mechanisms as have been pointed out specifically. Assume that the platform is in its lowered position 73A, (Fig. 6) and it is desired to raise it. The operator turns the control shaft 51 in a clockwise direction, as viewed in Fig. 1, by either of the crank handles 84 or 85 and the connected mechanisms. This moves the rod 44 and the clutch member 30 to bring its teeth 31 into engagement with the teeth 35 on the driven shaft 33. The latter rotates in the direction indicated by the arrow A, (Fig. 1), and its motion is transmitted through shaft 21 to which the member 30 is splined, worm 23, gear 24, pawls 27 and ratchet 26 to the shaft 22 in the direction indicated by the arrow B. This will rotate the drums to wind up cables 80 and raise the platform. It will continue to rise until the control shaft is centered to move the clutch teeth 31 and 35 out of engagement. The pitch of the worm 23 and gear 24 is such as to be self-locking so that no amount of weight on the platform will cause it to descend.

A crank handle 87A (Fig. 7) is provided for the end of shafts 82, by means of which the platform may be raised manually. If the gear 24 is not rotating when this is done, the ratchet 26 and pawls 27 will prevent the platform from running down.

To lower the platform the control shaft is turned in the opposite direction to bring clutch teeth 32, 42 into engagement. It will be noted that the pawls 27, then rotating in a clockwise direction, will not drive the shaft 22. The weight of the platform or of the platform and a load on it will, however, tend to rotate the shaft 22 and the ratchet 26 in a clockwise direction. This tendency will be opposed by the pawls 27 and the downward movement of the platform will be no faster than that allowed by the movement of gear 24 on which the pawls are mounted. This will depend upon the rate of rotation of the driving shaft 33 and the ratio of the gears between it and the clutch teeth 42.

As soon as the ends of the slides 70 reach the ground or other obstruction, the tension on the hoisting cables will be released and rotation of ratchet 26 stopped. Further rotation of gear 24 will have no effect upon the ratchet 26 so there will be no further slacking and consequent snarling of the hoisting cables. Thus, the lowering effect of the driving shaft 33 on the platform is automatically stopped whenever the downward movement of the slides is arrested.

Mechanism for automatically stopping the upward movement of the platform when it has reached a predetermined level, such as that of the floor 67 of the vehicle, is also provided.

A member which comprises a cylindrical surface 90 and a gear tooth 91 is keyed to shaft 22. The surface 90 engages concave surfaces 92 of a Geneva gear member 93 keyed to a shaft 94, and the tooth 91 engages indentations 95 between the surfaces 92. 96 is a roller on an arm 97 also fast on shaft 94 and in alinement with the cam surface 48 on lever 46. This arrangement is such that each revolution of shaft 22 imparts a comparatively rapid movement to member 93 for a distance equal to that between its indentations 95. In the specific form illustrated, eight revolutions of shaft 22 will impart one complete revolution to member 93 and the roller 96. The parts are so proportioned that about a half revolution of the member 93 will cause the platform to be stopped at the level of the floor of the vehicle, as shown at 73 in Fig. 6.

By moving the member 93 out of engagement with the surface 90 and tooth 91, adjusting it angularly on its shaft 94 and then moving it back to its engaged position, it may be made to stop the platform 73 at another predetermined level, either below or above the vehicle floor. When adjusted to require a complete revolution to actuate the rod 44, it will stop the platform at its extreme upper level 73B, Fig. 6. Another adjustment is provided by making a plurality of angular spaced key-ways 98 in the actuating member of the Geneva gear, a desired one of which may be made to engage the key 99 on shaft 22. In order to facilitate these adjustments a cover 20B for one end of casing 20 may be removed.

It has been shown that the hoisting movement is initiated by swinging lever 46 to the right. At this time the roller 96 is out of its way. The parts are so proportioned that as the platform 73 reaches a desired level, such as that of the floor 67 of the vehicle, the roller 96 reaches the cam surface 48 of lever 46 and pushes the latter back to its control position to disconnect the driving shaft 33 from the hoisting gearing, to bring the platform to rest at the floor level of the vehicle.

In order to insure complete disengagement of the clutch teeth 31 and 35, a plug 100 is provided in rod 44, pressed against the lower end of lever 46 at 45 by a spring 101. If the rod is not completely centered when the lever 46 reaches its central position, the pressure on plug 100 will continue the movement of rod 44 until the clutch teeth are disengaged.

If it is desired to raise a load above the floor level, it can be elevated by the hand crank after it has been stopped automatically, as far as such position as that indicated by broken lines at 73B in Fig. 6.

The mechanisms and arrangements herein shown and described may be varied to a considerable extent without departing from the spirit and scope of this invention, and I intend no limitations other than those imposed by the appended claims.

What I claim is:

1. An assembled structure arranged to be attached to a vehicle comprising a pair of parallel posts, a slide in each post, a platform connected to the slides, a transverse beam, hoisting mechanism, connections between the slides and the hoisting mechanism, said hoisting mechanism having a ratchet and pawl arrangement for transmitting power positively in one direction to said connections to raise the platform, means for automatically stopping said power transmitting arrangement, and other means for operating said connections to further raise the platform after the power transmitting arrangement has been automatically stopped.

2. An assembled structure arranged to be attached to a vehicle comprising a pair of parallel posts, a slide in each post, a platform connected to the slides, a transverse beam, hoisting mechanism, connections between the slides and the hoisting mechanism, said hoisting mechanism comprising a self-locking worm and gear and having a ratchet and pawl arrangement for transmitting power positively in one direction to said connections to raise the platform, means for automatically stopping said power transmitting arrangement, and other means for operating the connections to further raise the platform after the power transmitting arrangement has been automatically stopped.

3. A pair of parallel posts arranged to be attached to a vehicle, a slide guided by each post, a platform having one of its edges pivotally connected to the slides, and means for holding the platform normal to the posts during the movement of the slides and for allowing the edge of the platform opposite its pivoted edge to continue downward movement after the downward movement of the slides is arrested.

4. A pair of parallel posts arranged to be attached to a vehicle, a slide guided by each post, a platform having one of its edges pivotally connected to the slides, and means interconnecting parts of the slides and of the platform spaced from said pivotal connection for holding the platform normal to the posts during the movement of the slides, said interconnecting means including a lost motion device arranged to allow the edge of the platform opposite its pivoted edge to move downwardly after the downward movement of the slides is arrested.

5. A pair of parallel posts arranged to be attached to a vehicle, a slide guided by each post, a member near the upper end of each slide, movable in relation thereto, hoisting cables attached to said members, means for limiting the relative movement of the members in one direction, a platform having one of its edges pivotally connected to the slides near their lower ends, and supporting means between said members and points on the platform spaced from its pivoted edge arranged to allow the edge of the platform opposite its pivoted edge to continue downward movement after the downward movement of the slides is arrested.

6. A pair of parallel posts arranged to be attached to a vehicle, a slide in each post, a member near the upper end of each slide longitudinally movable therein, hoisting cables attached to said members, means for limiting the upward relative movement of the members, a platform having one of its edges pivotally connected to the slides near their lower ends, and supporting means between said members and points on the platform spaced from its pivoted edge arranged to allow the edge of the platform opposite its pivoted edge to move downwardly after the downward movement of the slides is arrested.

7. A pair of parallel posts arranged to be attached to a vehicle, a slide in each post, a member near the upper end of each slide longitudinally movable therein, hoisting cables attached to said members, means for limiting the upward relative movement of the members, means tending to move the members away from said limiting means, a platform having one of its edges pivotally connected to the slides near their lower ends, and supporting means between said members and points on the platform spaced from its pivoted edge arranged to allow the edge of the platform opposite its pivoted edge to move downwardly after the downward movement of the slides is arrested.

8. A pair of parallel posts arranged to be attached to a vehicle, a slide guided by each post, a platform having one of its edges pivotally connected to the slides, means interconnecting parts of the slides and of the platform spaced from said pivotal connection for holding the platform normal to the posts during the movement of the slides, said interconnecting means including a lost motion device arranged to allow the edge of the platform opposite its pivoted edge to move downwardly after the downward movement of the slides has been arrested, hoisting cables connected to the slides, hoisting mechanism having a ratchet and pawl arrangement for transmitting power positively in one direction of its rotation to the hoisting cables to raise the slides and for permitting the slides to descend in its other direction of rotation until their downward movement is arrested.

9. A pair of parallel posts arranged to be attached to a vehicle, a slide guided by each post, a platform having one of its edges pivotally connected to the slides, means interconnecting parts of the slides and of the platform spaced from said pivotal connection for holding the platform normal to the posts during the movement of the slides, said interconnecting means including a lost motion device arranged to allow the edge of the platform opposite its pivoted edge to move downwardly after the downward movement of the slides has been arrested, hoisting cables connected to the slides, hoisting mechanism having a ratchet and pawl arrangement for transmitting power positively in one direction of its rotation to the hoisting cables to raise the slides, means for automatically stopping the hoisting mechanism when the upward movement of the slides has raised the platform to a predetermined level and for permitting the slides to descend in its other direction of rotation until their downward movement is arrested.

10. A pair of parallel posts, a movable platform guided thereby, a power hoisting mechanism arranged to transmit power positively in one direction of its movement to raise the platform and in the opposite direction of its movement to permit the platform to descend, and means on at least one of the posts at different vertical positions for manually controlling both directions of movement of the hoisting mechanism and for stopping the movement of said hoisting mechanism in either of its directions.

11. A pair of parallel posts, a movable platform guided thereby, a power hoisting mechanism arranged to transmit power positively in one direction of its movement to raise the platform and in the opposite direction of its movement to permit the platform to descend, means spaced on at least one of the posts for manually controlling both directions of movement of the hoisting mechanism and for stopping the movement of said hoisting mechanism in either of its directions, and mechanism within said post interconnecting the spaced controlling means.

12. A pair of parallel posts, a movable platform guided thereby, a power hoisting mechanism arranged to transmit power positively in one direction of its movement to raise the platform and in the opposite direction of its movement to permit the platform to descend, manual means in different vertical locations in relation to said posts for controlling both directions of movement of the hoisting mechanism and for stopping the movement of said hoisting mechanism in either of its directions, and means for automatically stopping the upward movement of the platform when it has reached a predetermined level.

13. A pair of parallel posts, a movable platform guided thereby, a power hoisting mechanism arranged to transmit power positively in one direction of its movement to raise the platform and in the opposite direction of its movement to permit the platform to descend, manual means in different vertical locations in relation to said posts for controlling both directions of movement of the hoisting mechanism and for stopping the movement of said hoisting mechanism in either of its directions, means for automatically stopping the upward movement of the platform when it has reached a predetermined level, and manual means for further raising the platform after its automatic stop has been effected.

14. A pair of parallel posts, a movable platform guided thereby, a power hoisting mechanism arranged to transmit power positively in one direction of its movement to raise the platform and in the opposite direction of its movement to permit the platform to descend, a manually shiftable lever for controlling both directions of movement of the hoisting mechanism and for stopping the movement of said hoisting mechanism in either of its directions, gearing initially actuated by the hoisting mechanism to shift said lever in one direction after a predetermined amount of movement in its platform raising direction to automatically stop said movement, and a spring actuated device for completing the shifting of said lever to stopping position.

15. The combination of a vehicle having a floor, a pair of parallel posts affixed to the vehicle, a platform guided by the posts, gearing connected with the platform arranged to elevate the platform along the post guides, and vertically spaced manually actuated means below and above the floor for controling the gearing in both of its directions of movement.

16. The combination of a vehicle having a floor, a pair of parallel posts affixed to the vehicle, a platform guided by the posts, gearing connected with the platform, spaced manually actuated means on at least one of the posts below and above the floor for controlling the gearing, and mechanism within said post interconnecting said spaced means in both of its directions of movement.

17. A movable platform, a hoisting mechanism therefor, mechanism for stopping the movement of the hoisting mechanism after a predetermined movement of the platform, means actuated by the movement of the hoisting mechanism for initially actuating said stopping mechanism, and a spring actuated device for completing the actuation of the stopping mechanism.

18. An assembled hoisting structure for a highway vehicle having a chassis, said structure comprising a pair of parallel posts, a slide in each post, a platform connected to the slides, a transverse member interconnecting the posts near their lower ends adapted to be affixed to the chassis of the vehicle and arranged to support the assembled structure on the vehicle, a hoisting mechanism secured to said transverse member between said posts, and connections between the slides and the hoisting mechanism.

19. An assembled hoisting structure for a highway having a chassis, said structure comprising a pair of parallel posts, a slide in each post, a platform connected to the slides, a transverse member interconnecting the posts near their lower ends adapted to be attached to the chassis of the vehicle and arranged to support the assembled structure on the vehicle, a hoisting mechanism secured to said transverse member between said posts, and connections between the slides and the hoisting mechanism, said hoisting mechanism having a ratchet and pawl arrangement for transmitting power positively in one direction to said connections to raise the platform and for permitting manual operation of said connections in the same direction.

20. An assembled hoisting structure for a highway vehicle, said structure comprising a pair of parallel posts, a slide in each post, a platform connected to the slides, cable drums supported on the posts near their lower ends, cable sheaves supported on the posts near their upper ends, cables attached at one of their ends to the slides extending over said sheaves and attached at their opposite ends to the cable drums, means for rotating the drums to raise and lower the platform, and a transverse member interconnecting the posts adapted to be affixed to the vehicle and arranged to support the assembled structure on the vehicle.

21. An assembled hoisting structure for a highway vehicle, said structure comprising a pair of parallel posts, a slide in each post, a platform connected to the slides, cable drums supported on the posts near their lower ends, cable sheaves supported on the posts near their upper ends, cables attached at one of their ends to the slides extending over said sheaves and attached at their opposite ends to the cable drums, a transverse member interconnecting the posts for affixing the assembled structure to the vehicle arranged to support the assembled structure on the vehicle, and means secured to the transverse member between the posts for rotating the drums.

22. In a highway vehicle the combination of a pair of parallel posts, a movable platform guided thereby, hoisting mechanism on the vehicle arranged to transmit power positively in one direction of its movement to raise the platform and in the opposite direction of its movement to permit the platform to descend, said hoisting mechanism comprising a power transmission shaft, a free wheeling clutch on said power transmission shaft having a driven member affixed thereto, a worm gear freely supported on said power transmission shaft, a driving member affixed to said worm gear arranged to engage the driven member in one direction of movement of the worm gear, a driven shaft, a worm affixed to said driven shaft and engaging the worm gear, power means for driving said driven shaft, a movable driving clutch member on said driven shaft, a clutch shifting rod below the axis of the power transmission shaft for transmitting rectilinear movement to the clutch member, manually movable means above the axis of the power transmission shaft for controlling movement of the clutch shifting rod, to effect raising or lowering of the platform and for stopping the movement of the hoisting mechanism in either of its directions and gearing actuated by the hoisting mechanism arranged to cause the clutch shifting rod to disengage the driving clutch member from the power driving means after a predetermined amount of movement of the worm gear in its platform raising direction to automatically stop said movement.

23. An assembled hoisting structure for a highway vehicle having a chassis, said structure comprising a pair of parallel posts, a transverse member interconnecting the posts near their lower ends adapted to be affixed to the chassis of the vehicle and arranged to support the assembled structure on the vehicle, a hoisting mechanism secured to said transverse member between the posts, said hoisting mechanism being arranged to transmit power positively in one direction of its movement to raise the platform and in the opposite direction of its movement to permit the platform to descend, said hoisting mechanism comprising a power transmission shaft, a free wheeling clutch on said power transmission shaft having a driven member affixed thereto, a worm gear freely supported on said power transmission shaft, a driving member affixed to said worm gear arranged to engage the driven member in one direction of movement of the worm gear, a driven shaft, a worm affixed to said driven shaft and engaging the worm gear, power means for driving said driven shaft, a movable driving clutch member on said driven shaft, a clutch shifting rod below the axis of the power transmission shaft for transmitting rectilinear movement to the clutch member, manually movable means above the axis of the power transmission shaft for controlling movement of the clutch shifting rod to effect raising or lowering of the platform and for stopping the movement of the hoisting mechanism in either of its directions and gearing actuated by the hoisting mechanism arranged to cause the clutch shifting rod to disengage the driving clutch member from the driving means after a predetermined amount of movement of the worm gear in its platform raising direction to automatically stop said movement.

24. In a highway vehicle the combination of a pair of parallel posts, a movable platform guided thereby, hoisting mechanism on the vehicle arranged to transmit power positively in one direction of its movement to raise the platform and in the opposite direction of its movement to permit the platform to descend, said hoisting mechanism comprising a power transmission shaft, a free wheeling clutch on said power transmission shaft having a driven member affixed thereto, a worm gear freely supported on said power transmission shaft, a driving member affixed to said worm gear arranged to engage the driven member in one direction of movement of the worm gear, a driven shaft, a worm affixed to said driven shaft and engaging the worm gear, power means for driving said driven shaft, control means for manually effecting movement of the driven shaft in opposite directions, comprising a movable member arranged parallel to said driven shaft for transmitting rectilinear movement to the control means to effect raising or lowering of the platform.

25. The combination of a power driven highway vehicle having wheels, axles for the wheels and a floor with a tailgate elevator supported by the axles, power operated mechanism on the vehicle for raising and for controlling the lowering of the tailgate elevator to and from the level of said floor and two handle means on the vehicle, one above and the other below the floor for controlling said mechanism.

HAROLD W. SHONNARD.